(No Model.)
R. C. NUGENT.
DEVICE FOR TRUING-UP MAIN OR CRANK PINS.
No. 460,884. Patented Oct. 6, 1891.
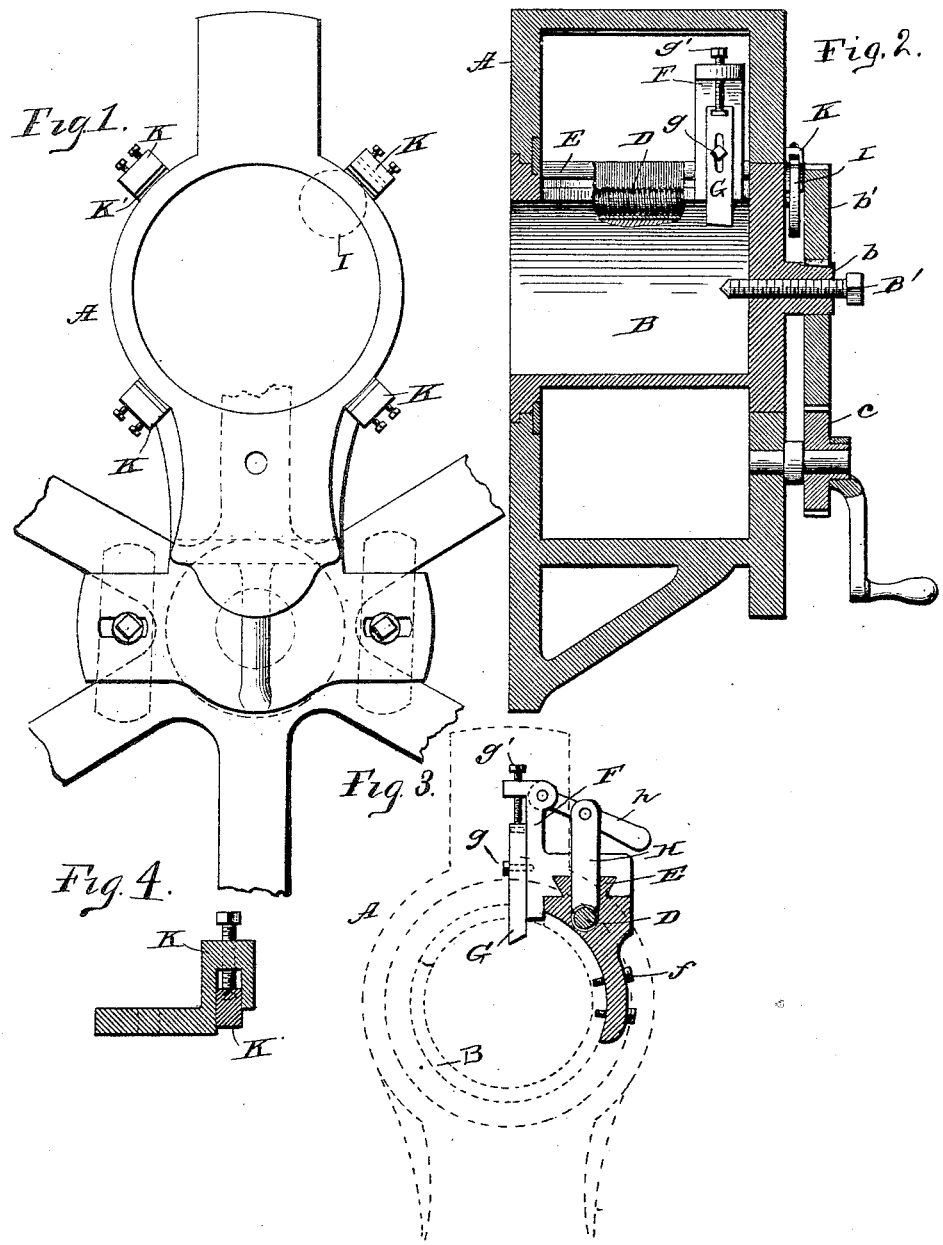
WITNESSES:
INVENTOR
Richard C. Nugent,
BY Church & Church
HIS ATTORNEYS

UNITED STATES PATENT OFFICE.

RICHARD C. NUGENT, OF HARRISBURG, PENNSYLVANIA, ASSIGNOR OF ONE-HALF TO JAMES JENKINS, OF SAME PLACE.

DEVICE FOR TRUING UP MAIN OR CRANK PINS.

SPECIFICATION forming part of Letters Patent No. 460,884, dated October 6, 1891.

Application filed December 20, 1890. Serial No. 375,302. (No model.)

*To all whom it may concern:*

Be it known that I, RICHARD C. NUGENT, of Harrisburg, in the county of Dauphin and State of Pennsylvania, have invented certain new and useful Improvements in Devices for Truing Up Main or Crank Pins of Engines and Locomotives; and I do hereby declare the following to be a full, clear, and exact description of the same, reference being had to the accompanying drawings, forming a part of this specification, and to the letters of reference marked thereon.

This invention relates to improvements in devices for dressing or "truing" up the main or crank pins of locomotives, which it is found cut out quickly and require frequent attention; and it is one of the objects of this invention to produce a simple and easily applied and operated device for dressing or truing up such pins without the necessity of removing the pin or wheel from the locomotive.

The invention consists in certain novel details of construction and combinations and arrangements of parts to be now described, and pointed out particularly in the appended claims.

In the accompanying drawings, Figure 1 is a front elevation of the frame of the device with the cutter feed-wheel dotted in outline and showing the device attached to the drive-wheel of a locomotive. Fig. 2 is a vertical section at right angles to Fig. 1 through the top of the device, with the working parts in position. Fig. 3 is a front elevation of the cutter and connected operating parts, with the frame and cylindrical rotary head in dotted lines and the guide for the tool-stock in section. Fig. 4 is a detail section.

Similar letters of reference in the several figures indicate the same parts.

The frame A of the device is preferably provided with means—such as screws and clamps or other ordinary means—by which the frame is secured to the hub of the wheel, and at the other end is formed into a large annular bearing, in which the cylindrical rotary head B is journaled. This head, it will be understood, fits around the main pin to be trued up, and in order to insure its true central position a centering-screw B' passes through the boss $b$ in its closed end and is adapted to engage the center of the pin, which is usually indicated by a small depression or center used in turning the pin originally. On the boss $b$ is rigidly mounted a large gear-wheel $b'$, with which meshes the smaller gear-wheel $c$, journaled on a stud-axle held in the body of the frame, (see Fig. 2,) and to the last-mentioned wheel is secured the crank-handle for imparting motion to the rotary head.

The rotary head B is provided at each end with peripheral flanges, the outer edges of which form the wearing-surfaces, and journaled in bearings in these flanges is a screw D, preferably lying entirely within a depression or recess in the dovetail way E, upon which slides the tool-stock F. The dovetail way is secured to the side of the cylindrical rotary head by the flange and screws $f$. (See Fig. 3.) Upon the front of the tool-stock is mounted the cutter G, held in place by the screw $g$, passing through a slot, and a second screw $g'$ passing through the top of the stock and engaging the upper end of the cutter. The function of the last-named screw is to adjust the vertical position of the cutter and hence the thickness of the surface or chip to be removed. It will be seen that a slot is formed through the wall of the cylindrical rotary head for the passage of the cutter, and the cutter and tool-stock are caused to travel along this slot by means of the screw before mentioned and the half-nut H, working through an opening in the stock and carried by a hand-lever $h$, pivoted to the stock. Ordinarily no special lock will be needed to hold the nut in or out of engagement, but any well-known form may be employed, if desired. The cutter, being mounted on the head, of course rotates therewith and planes off the pin the desired amount, and as the cutter is also fed along longitudinally of the pin it reduces its diameter uniformly throughout.

For the purpose of rotating the worm-screw during the rotation of the head and cutter, I mount a wheel I on the front end of the shaft of said wheel outside of the head and at suitable intervals around the periphery of the head; but mounted on the frame I provide surfaces which engage this wheel as it passes and give it a portion of a rotation. In the preferred construction friction is relied on to turn the wheel, and the surfaces mentioned are formed as shown in detail, Fig. 4, a small overhanging clip K being screwed to the frame and provided with a friction-piece K', of rubber or brass, with which the wheel contacts as it is being carried past on the head. Four of these engaging-surfaces are provided, arranged equal distances apart around the head, and hence the wheel receives four slight impulses during each revolution of the head, each impulse serving to move the tool-stock a short distance forward.

When it is desired to move the stock along the ways without rotating the screw—as, for instance, in returning it to first position, or to move the cutter over the central flange of the pin—it may be done by lifting the half-nut out of engagement by means of the hand-lever.

The device as a whole is simple, and practice has demonstrated that it is exceedingly efficient for the purpose intended, it being entirely practical to true up the main pin of a locomotive without removing the pin or moving the locomotive from the tracks, it being only necessary to remove the pitman and connecting-rod and apply the device.

While I have particularly described my present invention for use in truing up main or crank pins of locomotives, it is obvious the device is not limited to such use, but may be employed for truing up pins or cranks in stationary or marine engines, and in fact it may be employed for truing up pins of any character in any machine, it only being necessary to adapt the frame-work for being clamped in position.

Having thus described my invention, what I claim as new is—

1. In a truing-up device, the combination, with the frame having means for attachment to the wheel, of the cylindrical rotary head, the slot through said head extending longitudinally thereof, the cutter mounted in said slot and projecting through the rotary head, and the screw for moving said cutter longitudinally of said head, mounted in bearings outside of said rotary head, substantially as described.

2. In a pin-truing-up device, the combination, with the frame having means for securing it to the wheel and the rotary head having a slot therein journaled in said frame, of the ways mounted on the outside of said head, the tool-stock moving on the ways, the cutter mounted on the stock and passing through a slot in the head, the gears, and the crank-handle for rotating the head, substantially as described.

3. In a device for truing up crank-pins of locomotives, the combination, with the frame having means for attachment to the locomotive-wheel and the rotary head journaled in said frame, of the tool-stock, the screw journaled in the head, the half-nut sliding longitudinally through the stock in bearings formed therein and engaging the screw, and the lever pivoted to the stock and engaging the half-nut to move the same into or out of engagement, substantially as described.

4. In a device for truing up crank-pins of locomotives, the combination, with the frame having means for attachment to the locomotive-wheel and the slotted cylindrical rotary head having flanges at each end, of the ways bolted to the head between the flanges, the tool-stock mounted on said ways, the cutter on the stock, the screw lying within a depression in the ways, the half-nut passing through the stock and engaging the screw, and the lever pivoted to the stock and connected to the half-nut for moving the same into or out of engagement, substantially as described.

5. In a truing-up device for crank-pins and analogous work, the combination, with the frame having means for attachment to the wheel, the rotary cylindrical head journaled in said frame, and the block fastened to said head, of the ways on said block, the tool-stock sliding on said ways, the support F, formed integral with the tool-stock, forming a perpendicular bearing for the cutter, and the cutter having means, substantially as described, for the adjustment thereof.

RICHARD C. NUGENT.

Witnesses:
H. C. JENKINS,
A. S. HARBOLT.